Sept. 11, 1934.　　　W. O. THEWES　　　1,973,232
WORKHOLDER
Filed June 25, 1931
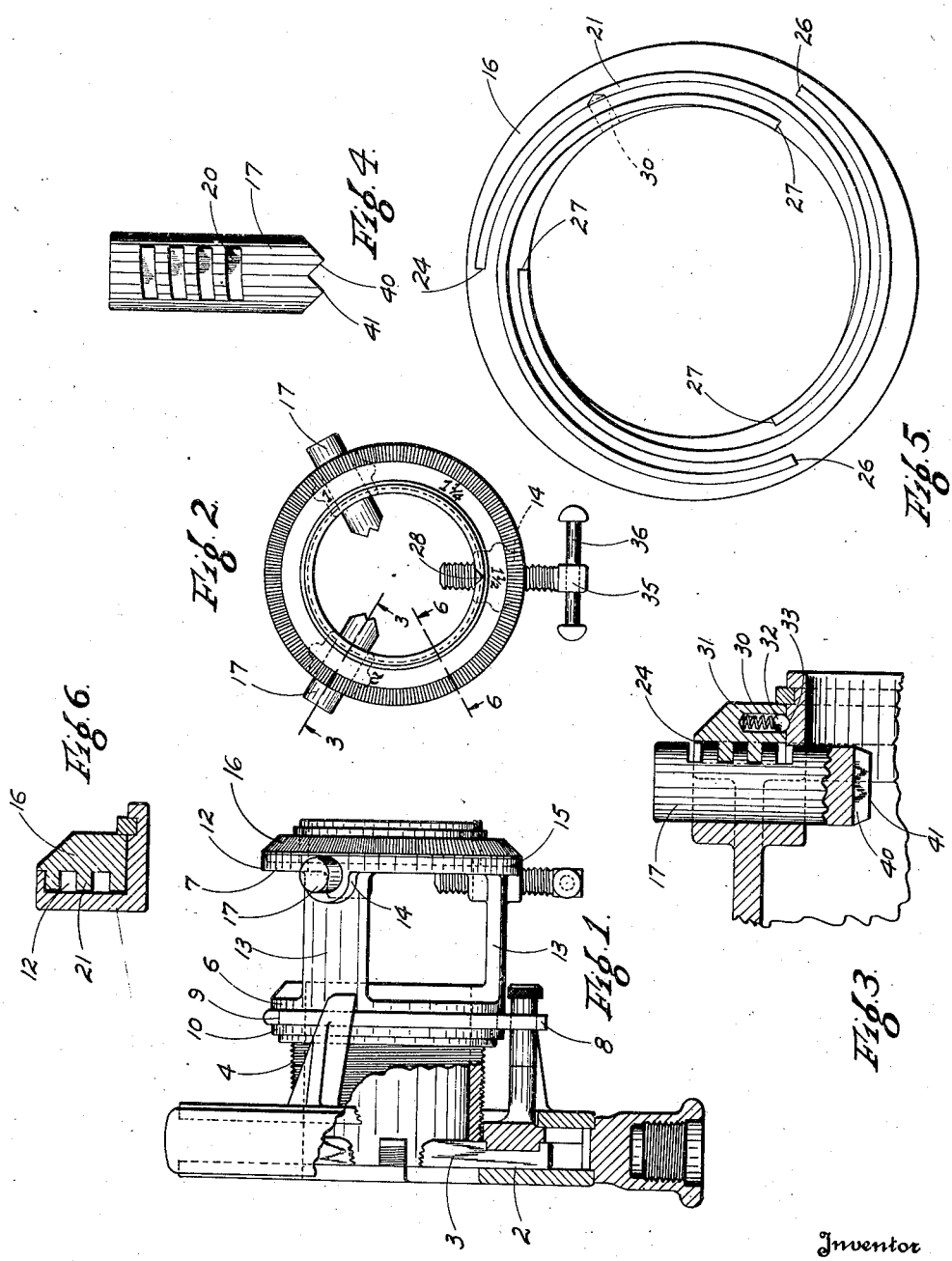
Inventor
WILLIAM O. THEWES.
By Richey & Watts
Attorney Patented Sept. 11, 1934

1,973,232

UNITED STATES PATENT OFFICE 1,973,232

WORKHOLDER

William O. Thewes, North Ridgeville, Ohio, assignor to The Ridgeville Tool Company, North Ridgeville, Ohio, a corporation of Ohio Application June 25, 1931, Serial No. 546,711

8 Claims. (Cl. 10—107)

This invention relates to work holders generally and more particularly to work holders for use in conjunction with pipe thread cutting dies, such for example as that shown in my co-pending application Serial No. 535,437 filed May 6, 1931.

The invention includes among its objects, to provide a work holder which is of a superior construction and advantageously co-operates with the die to support and draw the work or pipe being threaded into the die or, conversely, support and draw the die upon the work; to provide a work holder which may be quickly and easily adjusted to hold work of varying diameters; to provide a holder having a plurality of jaws which may be quickly and simultaneously adjusted to the desired size, and embodying indexing mechanism for setting the jaws which clearly indicates the size of work the jaws are set to hold; the construction being such that the jaws cannot unintentionally become lost or removed from the holder.

Other objects and advantages of the invention will become apparent in view of the following description taken in conjunction with the accompanying drawing, in which:

Figure 1 is a view mostly in elevation, but with certain parts broken away and shown in section, of a thread cutting tool with the work holder of my invention attached thereto;

Fig. 2 is an end view of the work holder;

Fig. 3 is a fragmentary sectional view taken on the line 3—3 of Fig. 2;

Fig. 4 is an elevational view of one of the jaws of the work holder; and

Fig. 5 is a full size elevational view of the index ring showing the jaw operating lands;

Fig. 6 is a section taken on the line 6—6 of Fig. 2.

Referring now to the figures of the drawing, throughout which like parts have been designated by like reference characters, the device which comprises the thread cutting mechanism is substantially as described in my co-pending application above noted and includes a chaser holding body 2 in which chasers 3 are reciprocated radially in the manner as described in said application.

The body of the thread cutter is provided with a threaded cylindrical boss or barrel 4 disposed in axial alignment with the chasers and adapted to support the work holder.

The work holder includes a cage-like frame having a pair of spaced ring portions 6 and 7. The portion 6 acts as a base and is internally threaded and adapted to be screwed upon the threaded barrel 4. The work holder as previously stated, engages the pipe and draws the thread cutter and pipe into engagement with each other in such a manner that the chasers cut a thread upon the pipe as is well known in the art.

The end 6 of the cage supports a change ring 8, the ring being telescoped around a reduced end of the annulus 6 and secured upon the end of the cage by a lock ring 10, which seats in a groove spaced from the shoulder 9 against which the ring 8 abuts. The change ring 8, as described in my co-pending application, is adapted to adjust the chasers for the various standard sizes of pipe which are to be threaded, such as 1", 1¼", 1½" and 2". The other ring 7 of the cage includes a flat annular flanged portion 12, which is supported in spaced relation from the base 6 by the arms 13, the drawing illustrating three such arms. At the juncture of each of the arms 13 and the ring 7 there is an enlarged boss 14. The end face of the flange 12 is provided with a smooth annular channel 15 which is adapted to act as a seat for an index ring 16, hereinafter more fully described.

Two of the bosses 14 are provided with radially disposed cylindrical apertures which extend towards the center of the holder. These apertures intersect the seat 15 and are adapted to provide guideways for work-gripping jaws 17. One of the jaws 17 is illustrated in elevation in Fig. 4, and comprises a cylindrical body which is provided with a plurality of transverse arcuate slots 20, there being four in number shown in the drawing. Each jaw is adapted to be reciprocated in its cylindrical aperture and the slotted portion extends through the channel 15. The index ring 16 is provided on its under surface with a plurality of concentric spiral lands 21, the illustration showing three thereof, which lands are of substantially the same radii as the grooves 20, of the jaws 17. As best shown in Fig. 3, the grooves in the jaw are of such depth that the bottoms thereof lie slightly below the bottom surface of the channel 15. In this manner the index ring may be disposed in the seat with the spiral lands resting upon or adjacent to the bottom of the channel seat and engaging the grooves 20 of the jaws. The edge 23 of the ring adjacent the periphery contacts with, or rests upon, the edge 24 bordering the channel 15.

It will be noted that the slots 20 on the jaws do not extend the entire length of the jaws but are spaced from the ends of the jaw. By providing the three concentric lands, there will be at least two of the lands engaging the slots in the jaw at all times. When the index is rotated, to retract or advance the jaw, the jaw may not be advanced or retracted entirely out of its guideway, because when said ring is rotated a certain predetermined distance, the outer or inner ends 26 and 27 of the lands, depending upon the direction of rotation, will engage the side of the jaw at a point where there are no arcuate slots 20 for the land to enter, thereby limiting the angular motion of the ring.

The radial movement of the jaws into or out of the work holder will be dependent upon the degree of revolution of the index and the pitch of the lands. The index is provided with suitable indicia on the outer surface such as "1'''", "1¼'''" and "2'''" which markings respectively indicate that when a particular mark, for example, mark "1'''", is opposite the index arrow 28, upon the end of the work holder, the work holder is set to receive a pipe of one inch size.

In order that the indexing mechanism may be positioned quickly and accurately for a certain size pipe, a resilient positioning device for stopping the ring at definite points in accordance with the various sizes is provided. This device is mounted in a radially disposed aperture 30 in the index ring and comprises a helical spring 31 which presses a ball 32 into detents 33. The detents 33 are disposed at predetermined positions about the periphery of the work holder. Thus the exact position of the jaws for 1", 1¼" etc. may be readily felt by the operator. The periphery of the ring 16 may be beveled and the surface knurled to provide an efficient gripping surface for the operator. Two of the jaws 17 are operated simultaneously in the manner described by rotating the index. The third jaw consists in a screw 35, which is disposed in a threaded aperture in one of the bosses 14 and which screw is provided with a handle 36. The screw 35 is adjusted independently of the jaws 17.

In operation, if it is decided to thread 1½ inch pipe, for example, the thread cutting chasers having been previously adjusted as discussed in my co-pending application, the jaws of the work holder are set at their proper position by rotating the index ring until the 1½" mark aligns with the index arrow 28, at which point the ball 32 will be felt to engage the detent 33. The device is now set for threading. In threading the pipe the screw jaw 35 is retracted sufficiently so that the clearance between the two jaws and the screw is slightly over 1½ inch to allow easy insertion of the pipe. The screw jaw is then tightened by turning the handle and screwing the same inward to thrust the pipe securely up against the jaws 17. The face of each jaw is provided with a gripping surface comprising a transverse notch 40, which is bordered by a pair of sharp edges 41. The pipe is thus securely held in position. When the thread cutter is rotated, the pipe being securely held in a vise, or the like, it will be seen that the threaded barrel will screw into the holder to draw the pipe into the chasers in a manner previously described.

I am aware that prior to my invention there have been numerous attempts to provide mechanisms for indexing chasers and jaws, but they have necessitated extended and complicated adjustments. Those that have the three jaws adjustable are not capable of a sufficient gripping action to fulfill the proper requirements. Those that have the single jaws adjustable cannot be expeditiously changed from one adjustment to the other, and often only one is for the correct size and the other for another size, which would make the operator cut a crooked thread.

What I claim is:—

1. A work holder of the class specified comprising a cage having a threaded base portion adapted to co-operate with a threaded cutting die, an annular jaw supporting portion formed with radial slide-ways, jaws mounted for radial movement in said slide-ways, an index ring adapted to advance and retract said jaws, and means for definitely positioning said ring at spaced points which indicate work diameters comprising a resiliently mounted detent member housed in the ring and adapted to engage in indexed depressions formed in the surface on which said ring has bearing.

2. A work holder of the class specified comprising a threaded base portion and an annular jaw supporting portion formed with slide-ways, jaws mounted in said slide-ways and formed with a plurality of arcuate slots, an index ring provided with a plurality of spiral lands which are adapted to engage in said slots to advance and retract said jaws, and an independently adjustable jaw not associated with said ring adapted to clamp the work against said first mentioned jaws.

3. A work holder of the class specified comprising a cage formed with a threaded base portion and an annular jaw supporting portion spaced from said base portion, said jaw supporting portion being formed with radial slide-ways, a pair of jaws disposed in said slide-ways, a threaded jaw adapted to co-operate with said first mentioned jaws, means for simultaneously adjusting the pair of jaws and means for independently adjusting the remaining jaw.

4. A work holder of the class specified comprising a cage having an internally threaded portion at one extremity and an annular jaw-supporting portion at its opposite extremity, said jaw supporting portion being formed with radial slide-ways, a plurality of radially disposed clamping jaws mounted in said slide-ways, an index ring for simultaneously adjusting at least two of said jaws, and means for independently adjusting the remaining jaw or jaws.

5. A work holder of the class specified comprising an annular cage having an internally threaded portion at one extremity and a jaw supporting portion at its opposite extremity, said jaw supporting portion being formed with at least three radially disposed openings, clamping jaws mounted in said openings, two of said jaws being formed with arcuate slots and mounted for sliding movement in their openings and the remaining jaw being threaded in its opening for independent adjustment, and an index ring formed with spiral lands on its under portion adapted to engage the arcuate slots of the two jaws whereby said slotted jaws are simultaneously adjusted.

6. A work holder of the class specified comprising an annular cage having a threaded portion at one extremity and a jaw supporting portion at its opposite extremity formed with radially disposed openings, clamping jaws slidably mounted in said openings, said jaws being formed with a plurality of arcuate slots spaced from opposite ends thereof, and an index ring formed with at least three relatively concentric spiral lands arranged in such manner that at least two of said lands are engaged in the said slots at all times, the outer and inner ends of the lands serving as limiting abutments with respect to the unslotted ends of the jaws.

7. A work holder of the class specified comprising an annular cage having a threaded portion at one extremity and a jaw supporting portion at its opposite extremity formed with radially disposed openings, clamping jaws slidably mounted in said openings, said jaws being formed with a plurality of arcuate slots, and an index ring formed with a plurality of relatively concentric spiral lands adapted to engage in said slots, the outer and inner ends of said lands contacting with the sides of said jaws after the latter have been advanced or retracted a certain distance by said ring and preventing further movement of the jaws.

8. A work holder of the class specified comprising an annular cage member, a plurality of radially-disposed clamping jaws mounted in said member and adapted to engage the work, means for adjusting two or more of said jaws simultaneously and holding them in fixed relation to the work independently of the remaining jaw or jaws, and an independently adjustable jaw not affected by adjustment of the simultaneously adjustable jaws for clamping and releasing the work with respect to the simultaneously adjustable jaws after they have been adjusted to the desired pipe diameter.

WILLIAM O. THEWES.

CERTIFICATE OF CORRECTION.

Patent No. 1,973,232.                                                                 September 11, 1934.

WILLIAM O. THEWES.

It is hereby certified that the assignee in the above numbered patent was erroneously written and printed as "The Ridgeville Tool Company" whereas said name should have been written and printed as The Ridge Tool Company, as shown by the records of the case in this office; and that the said Letters Patent should be read with this correction therein that the same may conform to the record of the case in the Patent Office.

Signed and sealed this 30th day of October, A. D. 1934.

Leslie Frazer (Seal)                                                                          Acting Commissioner of Patents.